(12) United States Patent
Moffitt et al.

(10) Patent No.: US 7,547,193 B2
(45) Date of Patent: Jun. 16, 2009

(54) ROTOR BLADE ASSEMBLY WITH HIGH PITCHING MOMENT AIRFOIL SECTION FOR A ROTARY WING AIRCRAFT

(75) Inventors: Robert Moffitt, Seymour, CT (US); James E. Duh, Derby, CT (US); Charles Berezin, Trumbull, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 411 days.

(21) Appl. No.: 11/187,663

(22) Filed: Jul. 22, 2005

(65) Prior Publication Data

US 2007/0020104 A1    Jan. 25, 2007

(51) Int. Cl.
*B64C 27/46* (2006.01)
(52) U.S. Cl. .................. 416/228; 416/223 R; 416/237; 416/DIG. 5
(58) Field of Classification Search ............. 416/223 R, 416/228, 23, 24, 237
See application file for complete search history.

(56) References Cited

U.S. PATENT DOCUMENTS

| | | | | |
|---|---|---|---|---|
| 3,822,105 A | * | 7/1974 | Jepson | 416/223 R |
| 4,427,344 A | * | 1/1984 | Perry | 416/223 R |
| 5,205,715 A | * | 4/1993 | Perry et al. | 416/228 |
| 5,246,344 A | * | 9/1993 | Perry | 416/228 |
| 5,419,513 A | * | 5/1995 | Flemming et al. | 244/12.2 |

* cited by examiner

*Primary Examiner*—Igor Kershteyn
(74) *Attorney, Agent, or Firm*—Carlson, Gaskey & Olds PC

(57) ABSTRACT

A main rotor blade assembly with a high negative pitching moment airfoil section having a pitching moment coefficient beyond (more negative than) −0.035 at Mach Numbers below 0.80 and a blade taper of 1:5 or greater.. The main rotor blade preferably limits blade torsional bending and an aft loaded tip airfoils to approximately 'no more' than that of conventional effective rotor blade designs based on conventional tip airfoil sections.

37 Claims, 7 Drawing Sheets

ROTOR BLADE ASSEMBLY WITH HIGH PITCHING MOMENT AIRFOIL SECTION FOR A ROTARY WING AIRCRAFT

BACKGROUND OF THE INVENTION

The present invention relates to a rotary wing aircraft rotor blade assembly, and more particularly to a rotary wing aircraft main rotor blade assembly with a high negative pitching moment airfoil section.

Conventional airplane propeller blade designs with aft loaded airfoils and high negative pitching moments are often utilized to enhance propeller performance. These airfoils generally have superior drag levels at design lift that increases propeller aerodynamic efficiency. The relatively large inherent airfoil pitching moments do not cause unacceptable torsional bending because propeller blades are rigid.

In general, aft loaded airfoils have not been used on rotary-wing aircraft main rotor blades to gain similar aerodynamic advantage since main rotor blades have higher aspect ratios and are relatively soft in torsion such that other favorable flight attributes may deteriorate. To maintain desired rotary wing attributes, the vast majority of rotary-wing aircraft utilize blade airfoils with quarter chord pitching moment between −0.02 and +0.02 prior to stall or transonic flow onset. In the few cases where this limit may be locally exceeded, airfoils with strong pitching moments in the opposite direction are used elsewhere on the rotor blade to mitigate adverse torsion bending. Negative attributes may include an increase in blade and control system weights, increases in aircraft vibration due to excessive blade torsion, and increases in high-speed rotor power and noise due to increased blade torsion. Blade and control system weights increase as equivalent fatigue life requirements must be maintained despite an increase in vibratory and steady loads. Affected components include the blade spar, blade control horns, control pushrods, the control swashplate scissors, and the swashplate activation servos. These components represent a significant portion of the total aircraft empty weight. Weight increases in these components directly impact aircraft mission payload capability. Furthermore, uncontrolled pitching moments from aft loaded airfoil may drive sufficient blade torsional bending to cause negative angles-of-attack and surface shocks on the advancing blade tip. The shocks increase required rotor power as well as the aircraft external noise signature.

SUMMARY OF THE INVENTION

A main rotor blade assembly according to one non-limiting embodiment of the present invention includes a high negative pitching moment airfoil section having a pitching moment coefficient beyond (more negative than) −0.035 at Mach Numbers below 0.80 and a blade taper ratio (1.5:1 or greater, for example 3:1). The main rotor blade assembly has an inboard section, an intermediate section and an outboard section wherein the outboard section includes the high negative pitching moment airfoil section and the blade taper. For example, the high negative pitching moment airfoil section may extend along the outer 25% of the blade while the taper may extend along the outer 20% of the blade. Alternatively, the high negative pitching moment airfoil section may extend along the outer 15% of the blade while the taper may extend along the outer 10% of the blade. However, it should be noted that that the present invention is not intended to be limited by the above-identified ranges, for example, the high negative pitching moment airfoil section may extend along the outer 10% of the blade while the taper may extend along the outer 8% of the blade, or both the high negative pitching moment airfoil section and the blade taper may extend over along the outer 25% of the blade. It is understood that in the above context, the terms "taper ratio" and "taper" refer to the inboard blade chord dimension prior to the tapered section, divided by the smaller blade chord at the end of the tapered blade section.

The main rotor blade assembly according to one non-limiting embodiment the present invention limits blade torsional bending of an aft loaded tip airfoil within a range usable for a main rotor blade application of a rotary wing aircraft. The bending and vibratory characteristics of a conventional main rotor blade provide a general baseline level that is at least maintained by the high negative pitching moment, tip airfoil section of the present invention in which steady and vibratory bending on the torsion, edgewise, and flatwise blade axes are contained and essentially equivalent to that of the baseline blade.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
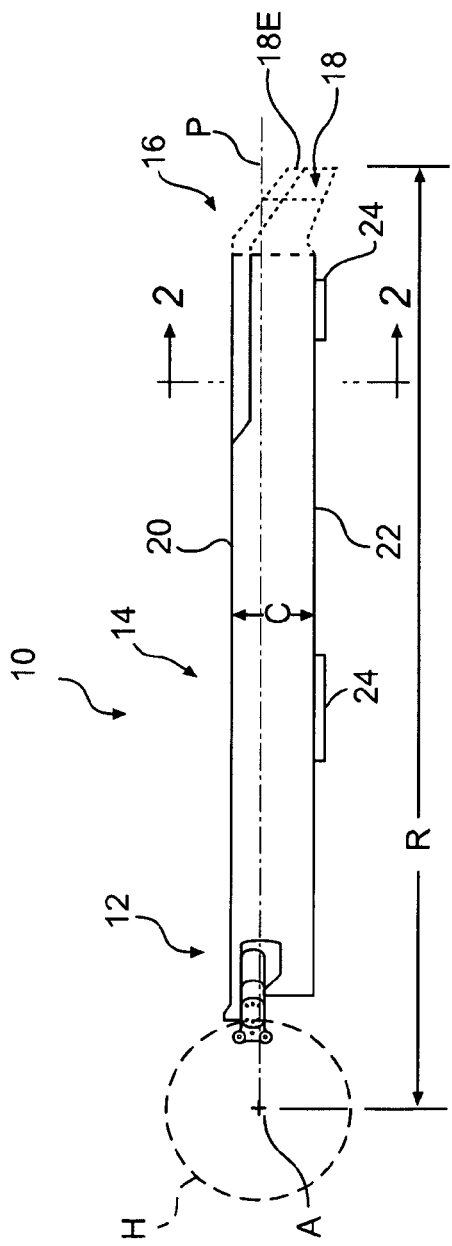
FIG. 1 is a top plan view of an exemplary main rotor blade assembly.
Figure 1A:
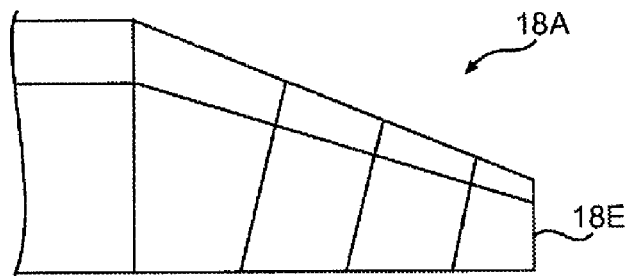
FIG. 1A is a top plan view of another main rotor blade assembly with an exemplary swept blade tip.
Figure 1B:
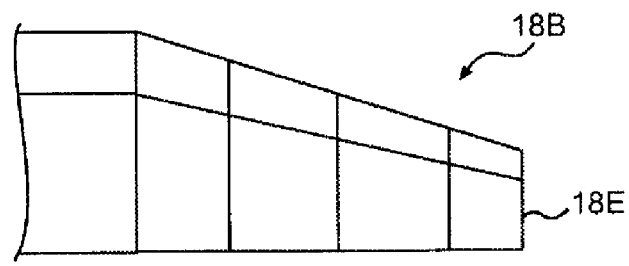
FIG. 1B is a top plan view of another main rotor blade assembly with an exemplary sheared blade tip.
Figure 1C:
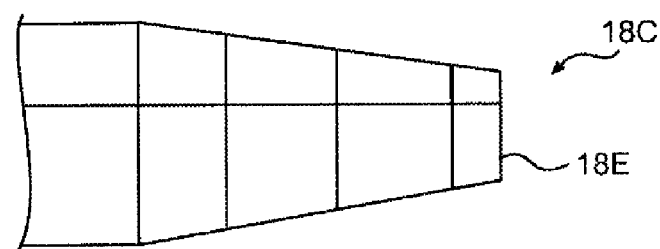
FIG. 1C is a top plan view of another main rotor blade assembly with an exemplary unswept blade tip with a progressive non linear taper.
Figure 1:
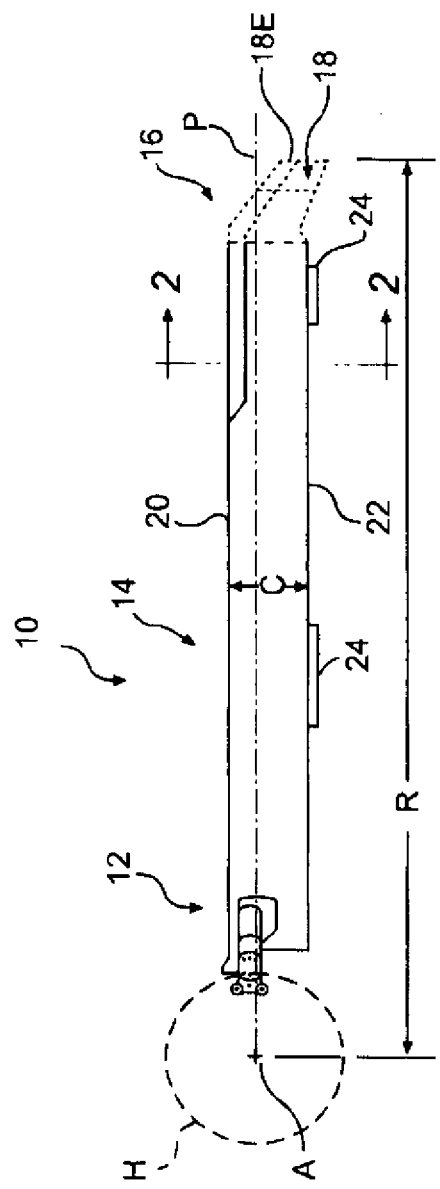
Figure 2:
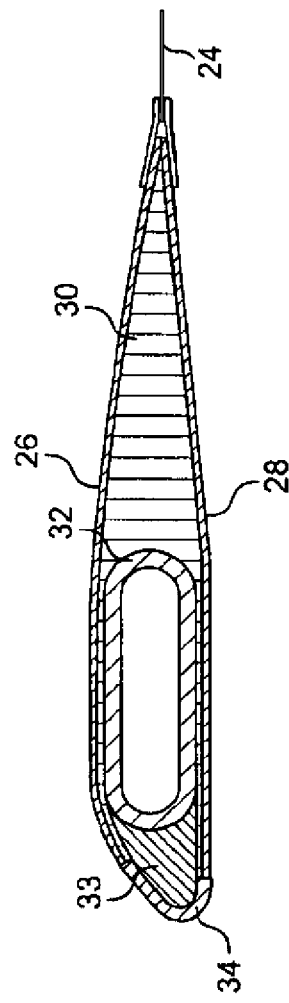
Figure 3A:
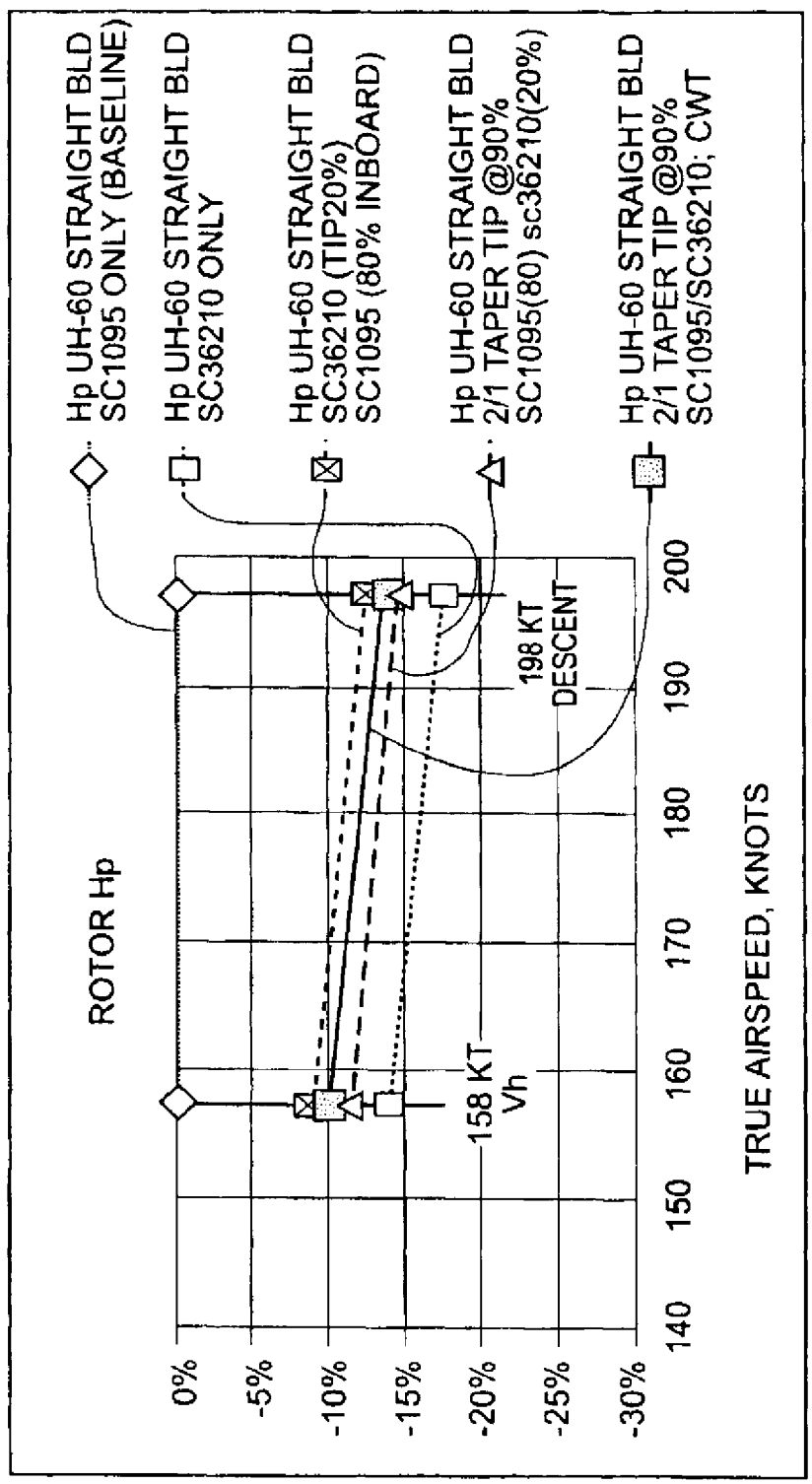
Figure 3B:
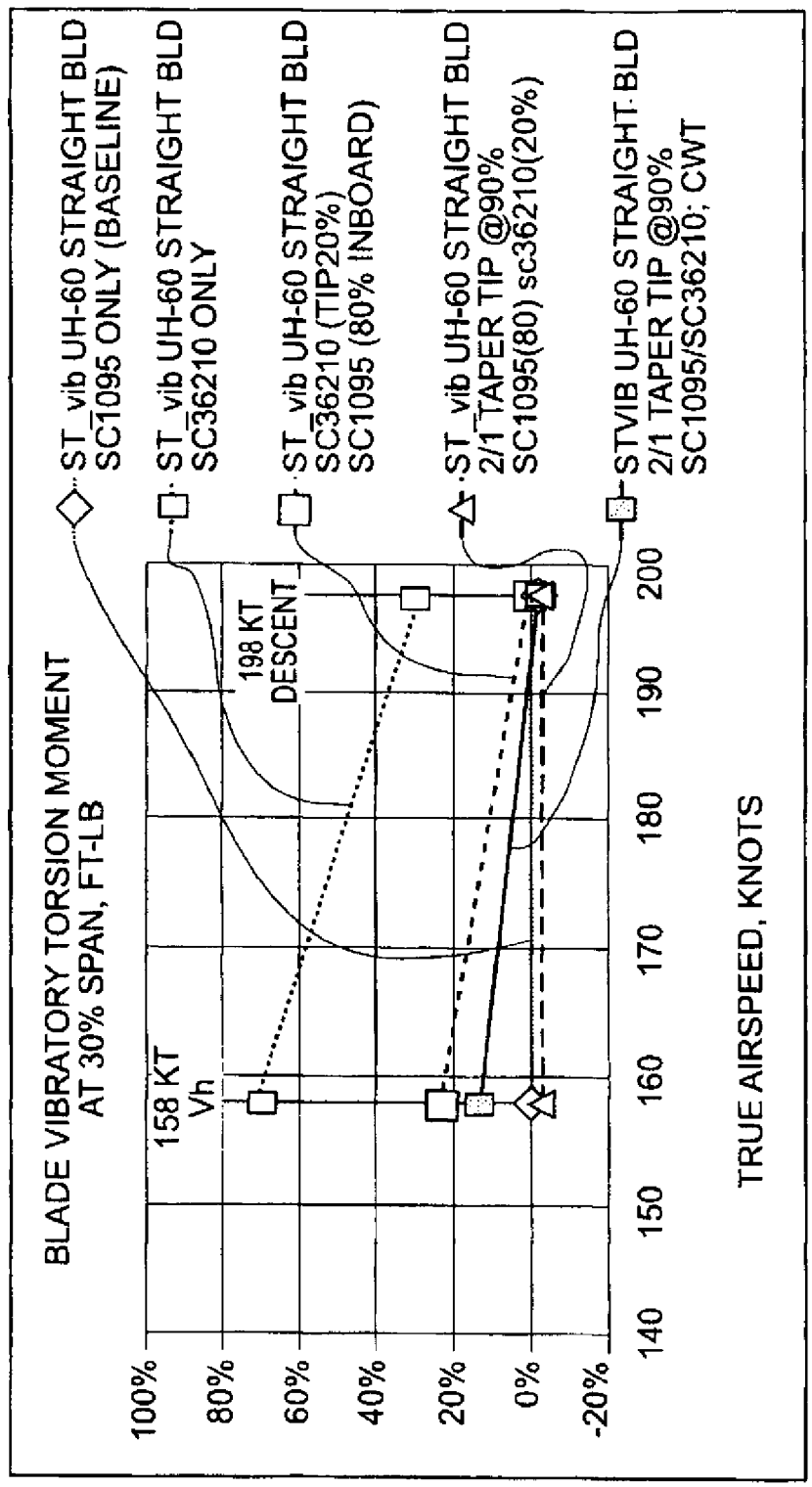
Figure 3C:
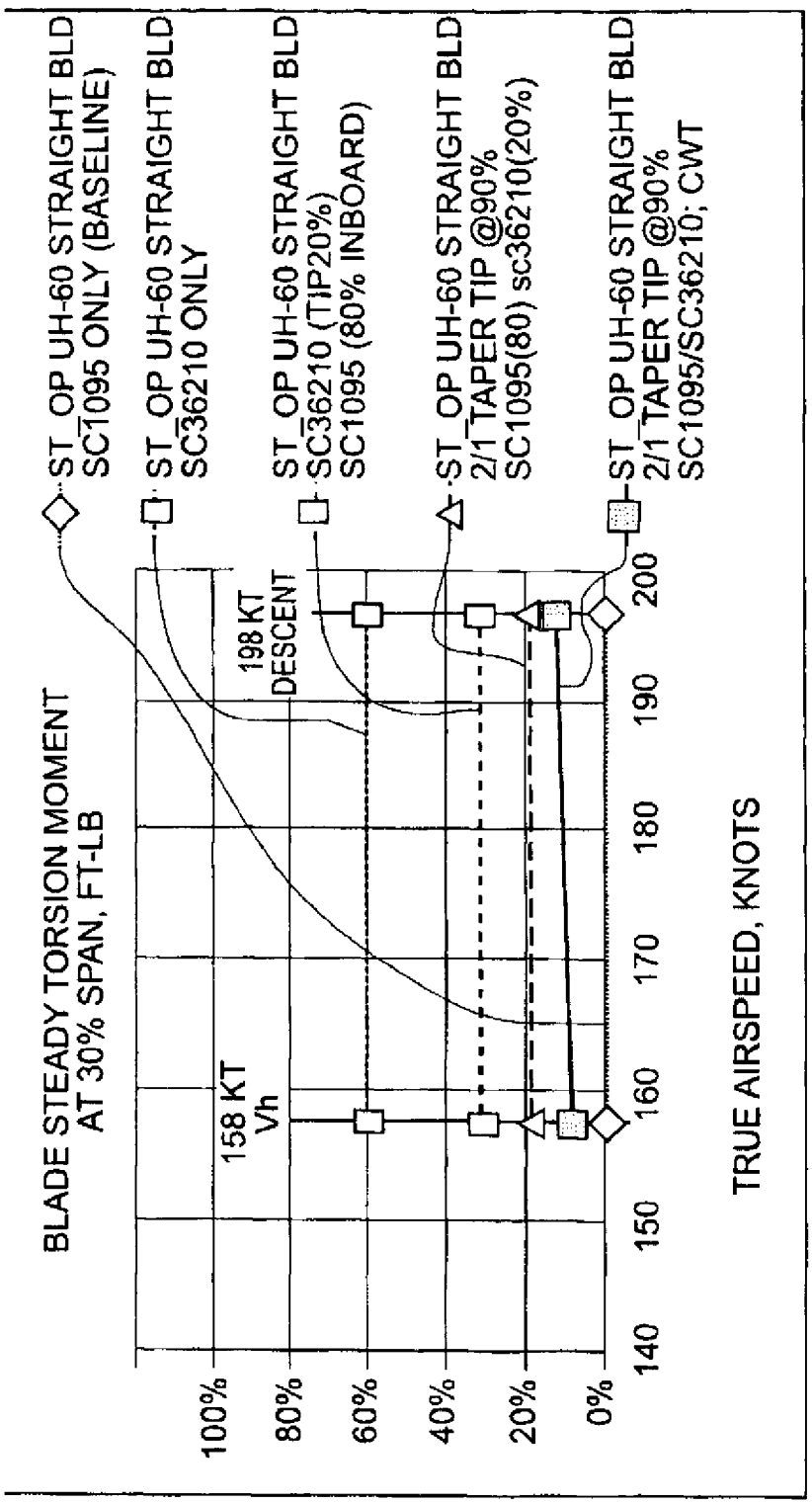
Figure 4A:
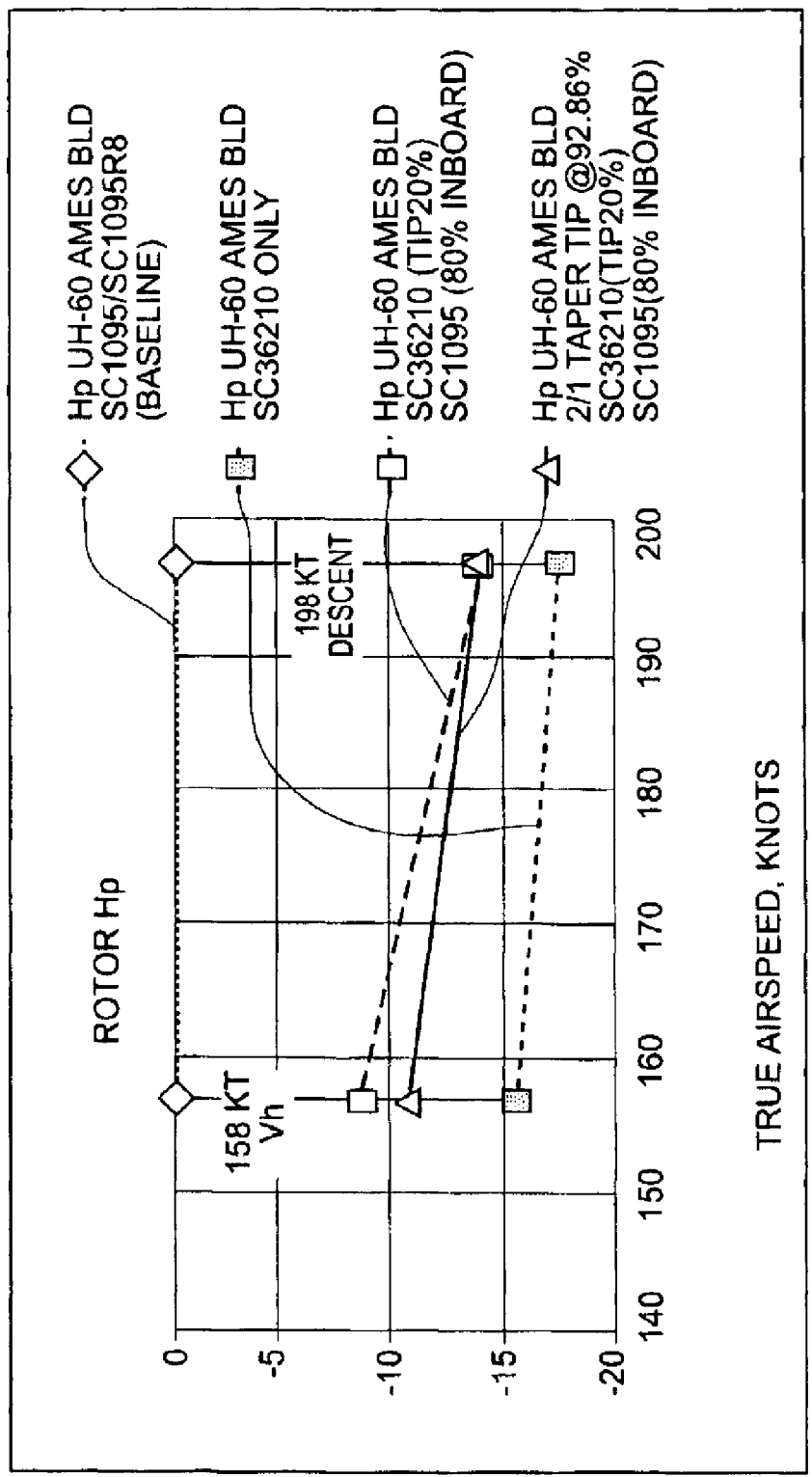
Figure 4B:
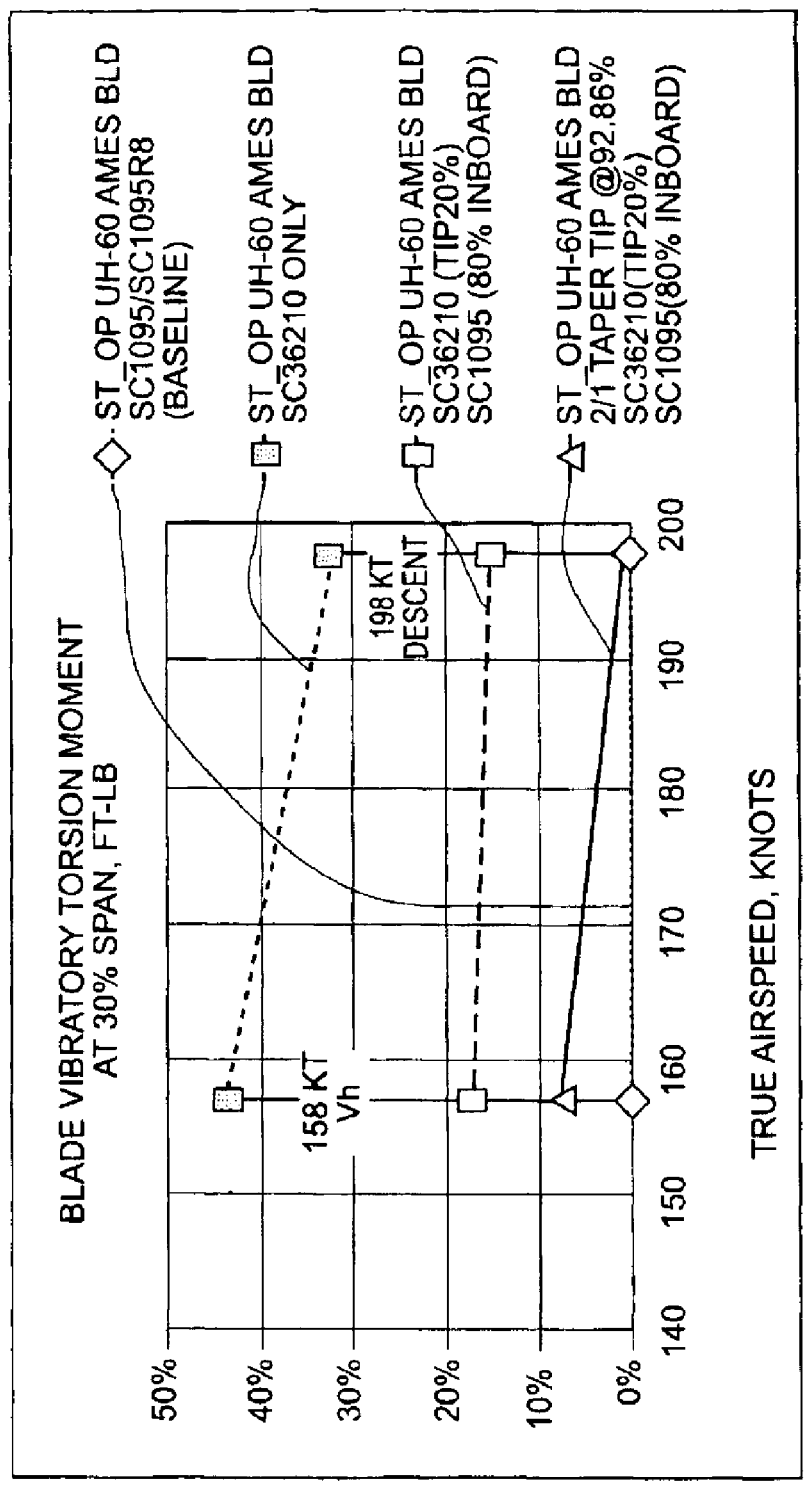
Figure 4C:
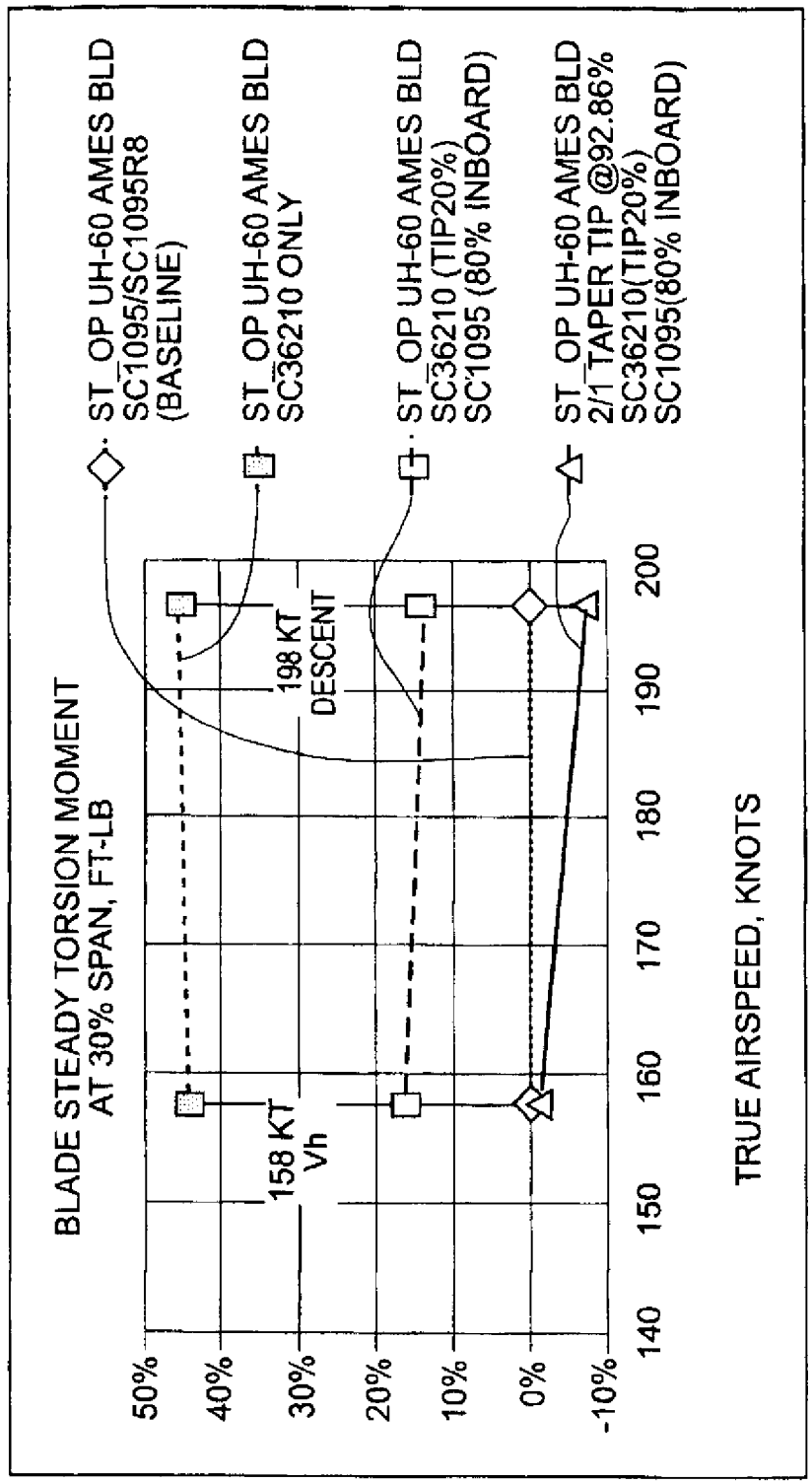
Figure 1A:
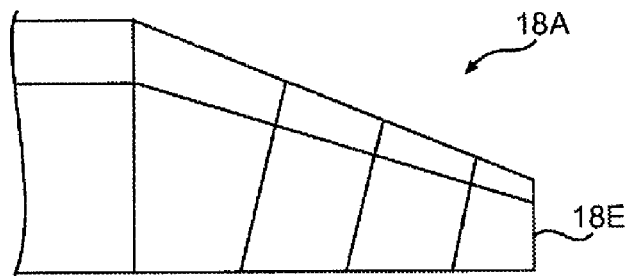
Figure 1B:
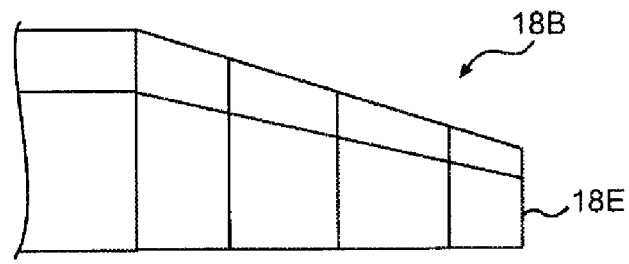
Figure 1C:
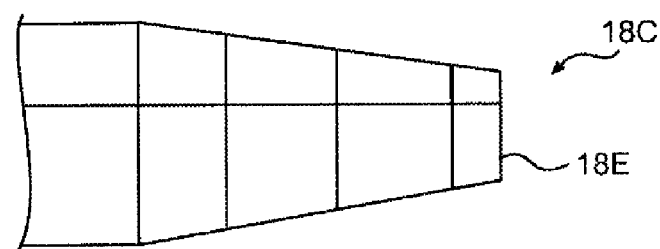

FIG. 1 schematically illustrates an exemplary main rotor blade 10 mounted to a rotor hub assembly H (illustrated schematically) for rotation about an axis of rotation A. The main rotor blade 10 includes an inboard airfoil section 12, an intermediate airfoil section 14, and an outboard airfoil section 16. The inboard, intermediate, and outboard sections 12, 14, 16 define the span of the main rotor blade 10. The blade sections 12, 14, 16 define a blade radius R between the axis of rotation A and a distal end 18E of a blade tip 18. It should be understood that the blade tip 18 may include various tip shapes, for example only, a swept blade tip 18A (FIG. 1A) a sheared tip 18B (FIG. 1B) or an unswept tip 18C with a progressive non linear taper (FIG. 1C).

A plurality of main rotor blades 10 project substantially radially outward from the hub assembly H and are supported therefrom in one of numerous attachments. Any number of main rotor blades 10 may be used with the rotor hub assembly H. Each main rotor blade 10 has a leading edge 20 and a trailing edge 22, which define the chord C of the main rotor blade 10. Adjustable trim tabs 24 extend rearwardly from the trailing edge 22. A pitching or faying axis P is close to the center of mass of the main rotor blade 10 in the chord wise direction and is also typically the elastic axis about which blade 10 twist occurs. The airfoil surface of the main rotor blade 10 is typically twisted linearly along the blade span to improve aerodynamic efficiency.

Figure 2:
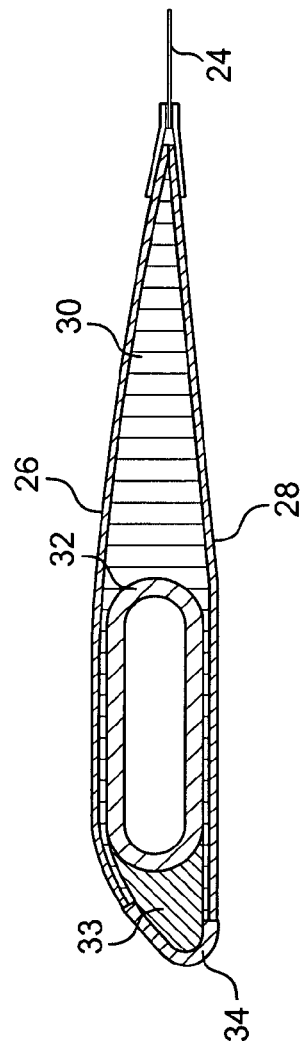
FIG. 2 is a cross-sectional view of the main rotor blade of FIG. 1 taken along line 2-2 thereof.

Referring to FIG. 2, upper and lower skins 26, 28 define the upper and lower aerodynamic surfaces of the main rotor blade 10. It should be understood that relative positional terms such as "forward," "aft," "upper," "lower," "above," "below," and the like are with reference to the normal operational attitude of the vehicle and should not be considered otherwise limiting. The skins 26, 28 are formed from several plies of prepreg composite material such as woven fiberglass material embedded in a suitable resin matrix. A core 30, a spar 32, one or more counterweights 33, and a leading-edge sheath 34 form the interior support for the skins 26, 28 of the main rotor blade 10. The spar 32 functions as the primary structural member of the main rotor blade 10, reacting the torsional, bending, shear, and centrifugal dynamic loads developed in the rotor blade 10 during operation.

The present invention limits blade torsional bending of an aft loaded tip airfoil to approximately "no more" than that seen with previous convention rotary-wing aircraft blade designs based on conventional tip airfoil sections. The bending and vibratory characteristics of a SIKORSKY UH-60 "BLACK HAWK" standard main rotor blade were selected as providing the desired levels to be achieved with the high negative pitching moment, tip airfoil section designed according to one non-limiting embodiment of the present invention. This established a baseline that was well accepted and in flight service for over 25 years. It should be understood that the characteristics of an airfoil designed according to one non-limiting embodiment of the present invention, however, is not to be limited to only this baseline airfoil. That is, certain characteristics of an airfoil designed according to one non-limiting embodiment of the present invention may deviate from the baseline airfoil yet still provide an aft loaded tip airfoil with flight characteristics within a range usable for a main rotor blade application of a rotary wing aircraft.

A well established and correlated Sikorsky Rotor Dynamic Code (referred to as RDYNE) was used to evaluate the feasibility of using the aft loaded tip airfoil in combination with high rates of tip chord taper on a UH-60 standard swept tip rotor blade in which the steady and vibratory bending on the torsion, edgewise, and flatwise blade axes were well contained and essentially equivalent to that of the baseline blade.

Generally, the preferred high pitching moment airfoil section according to one non-limiting embodiment of the present invention (designated herein as "SC-X"; FIGS. 3A-3C and 4A-4C) includes a blade linear taper (for example 1.5:1 or greater) and a pitching moment coefficient beyond (more negative than) −0.035 at Mach Numbers below 0.80. The "SC-X" airfoil section according to one non-limiting embodiment of the present invention is an aft cambered airfoil numerically optimized for high drag divergence Mach Numbers at a design CL of 0.2 and increased CL Max at Mach numbers between 0.5 and 0.7. The high pitching moment airfoil section "SC-X" is applied to the outer 20% span of a rotor blade. In another non-limiting embodiment, the high pitching moment airfoil section "SC-X" is located on the outer 15% blade span with a 3:1 chord taper on the outer 10% blade span. In addition, tip sweep (FIG. 1) was increased from 20 deg on the outer 7% of the UH-60 blade span to 30 deg on the outer 8% blade span. In all other respects, the main rotor blade assembly of the present invention provides matching structural dynamics and aerodynamics to the baseline UH-60A blade.

Tip taper can be applied either as a constant linear taper or as a progressive non-linear taper that replaces the same blade tip area. In either case, the net reduction in tip planform area is the important driver for mitigating blade torsion bending due to use of the high pitching moment tip airfoil section. Therefore, references in this patent to particular tip taper (such as 1.5 or 2:1 over the outer 10% blade span) refer interchangeably to both a linear taper and a progressive taper that removes an identical planform area from the blade tip.

As with progressive taper, a compound tip taper comprised of several straight taper segments, with varying taper rates, could also be used to reduce blade tip planform area. The generic term 'tip taper' also refers to these embodiments as long as the net removed blade tip planform area is equivalent.

Applicant has determined that tip taper mitigates adverse blade torsional bending of high pitching moment airfoil sections to acceptable baseline values (as represented herein by the current UH-60 blade design) for either a swept tip blade or a straight tip blade. Furthermore, Applicant has determined that tip taper is equally effective for both straight (FIGS. 3A-3C) and swept tips (FIGS. 4A-4C). In other words, tip sweep is not an independent variable for controlling airfoil pitching moment. At the same time, applicant has determined that the improved maximum lift coefficient of these airfoils enables tips with tapered planforms to operate at high aerodynamic efficiency by accommodating the increases in tip lift coefficient required for both straight tapered and swept tapered tips.

Figure 3A:
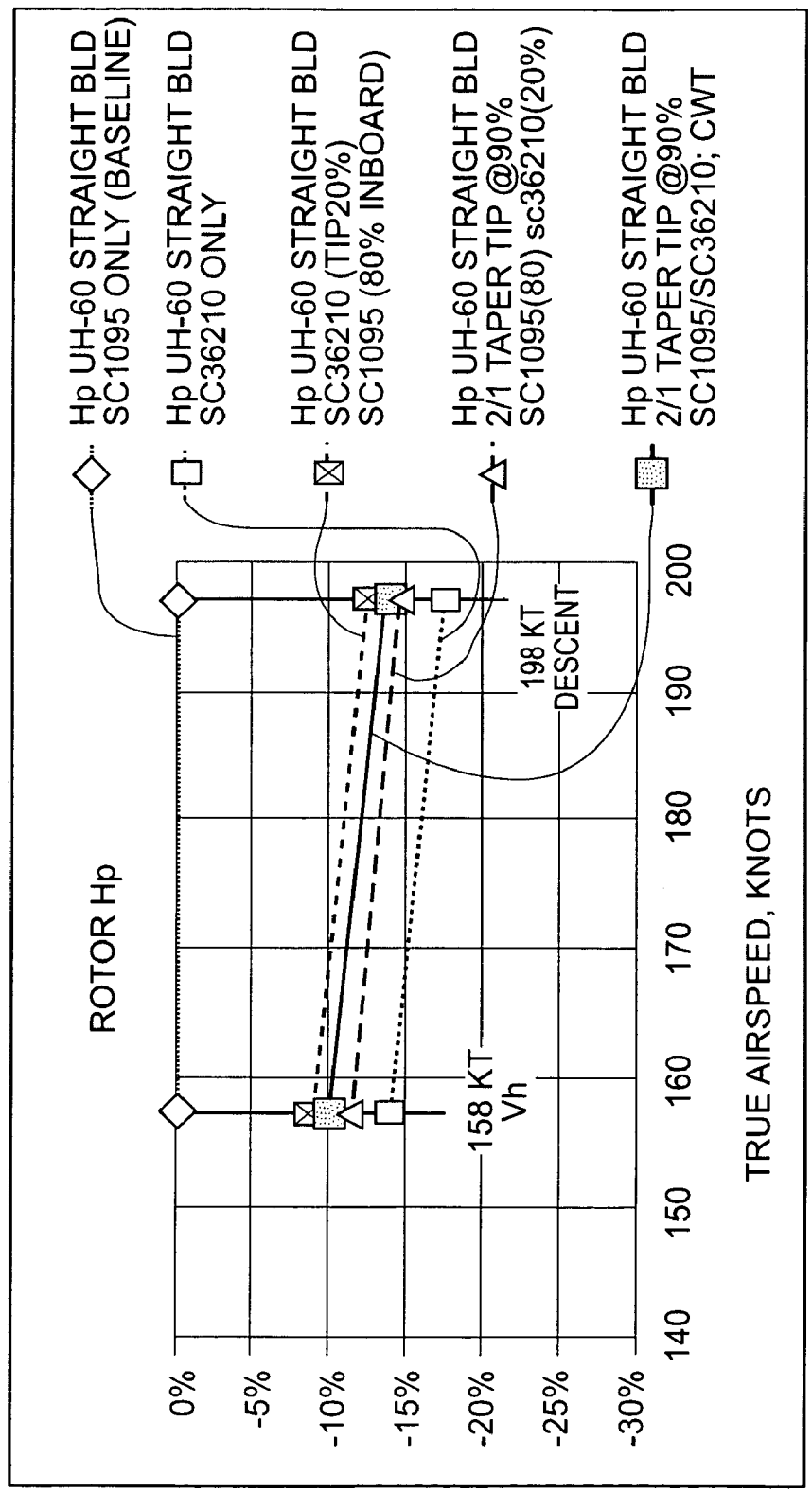
FIG. 3A is a graphical representation of rotor horsepower requirements for a rotor blade with a straight tip, various high pitching moment coefficient airfoil extents and various tip tapers according to one non-limiting embodiment of the present invention compared to a conventional rotor blade.
Figure 3B:
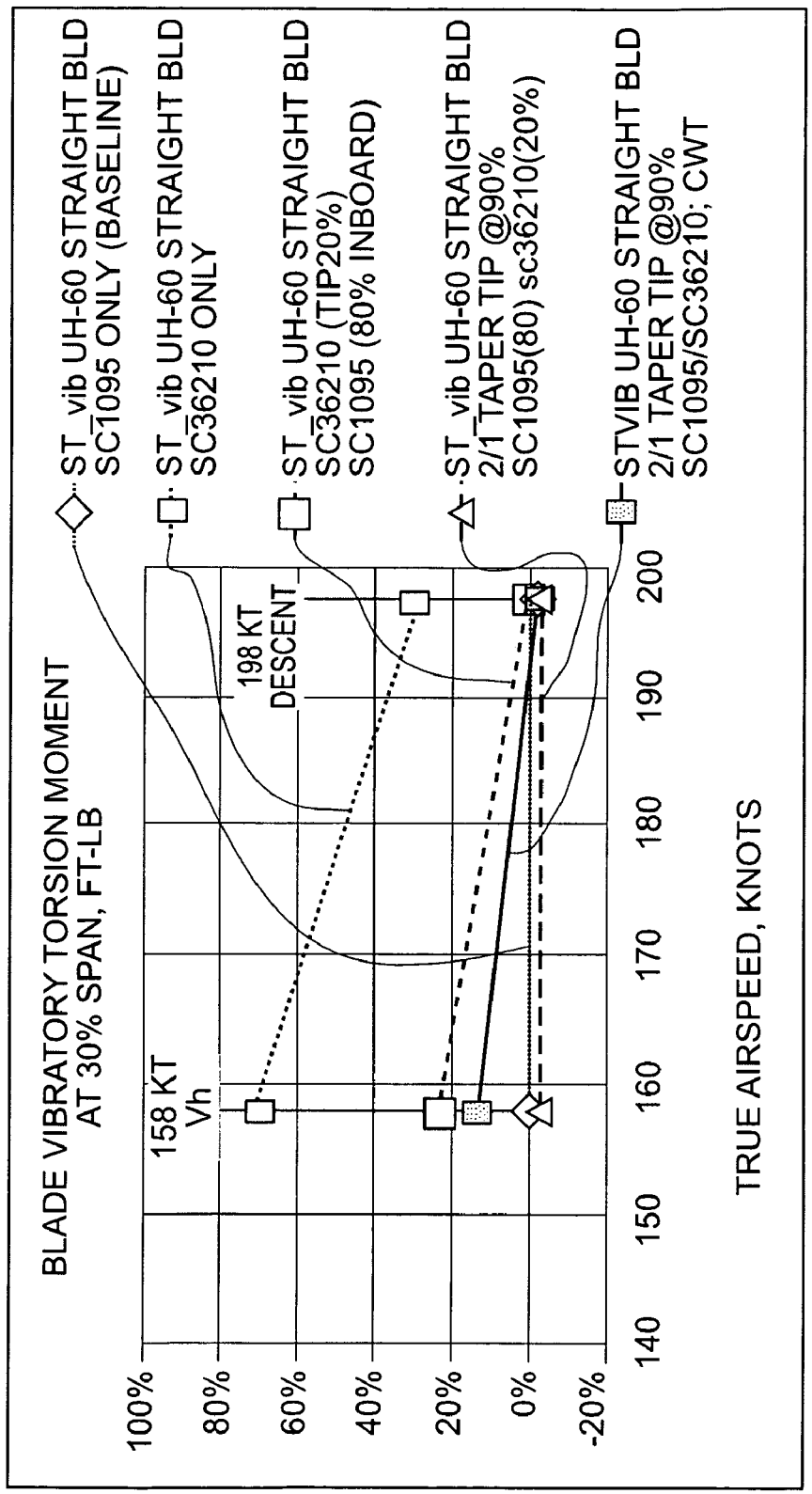
FIG. 3B is a graphical representation of vibratory torsion moments for a rotor blade with a straight tip, various high pitching moment coefficient airfoil extents and various tip tapers according to one non-limiting embodiment of the present invention compared to a conventional rotor blade.
Figure 3C:
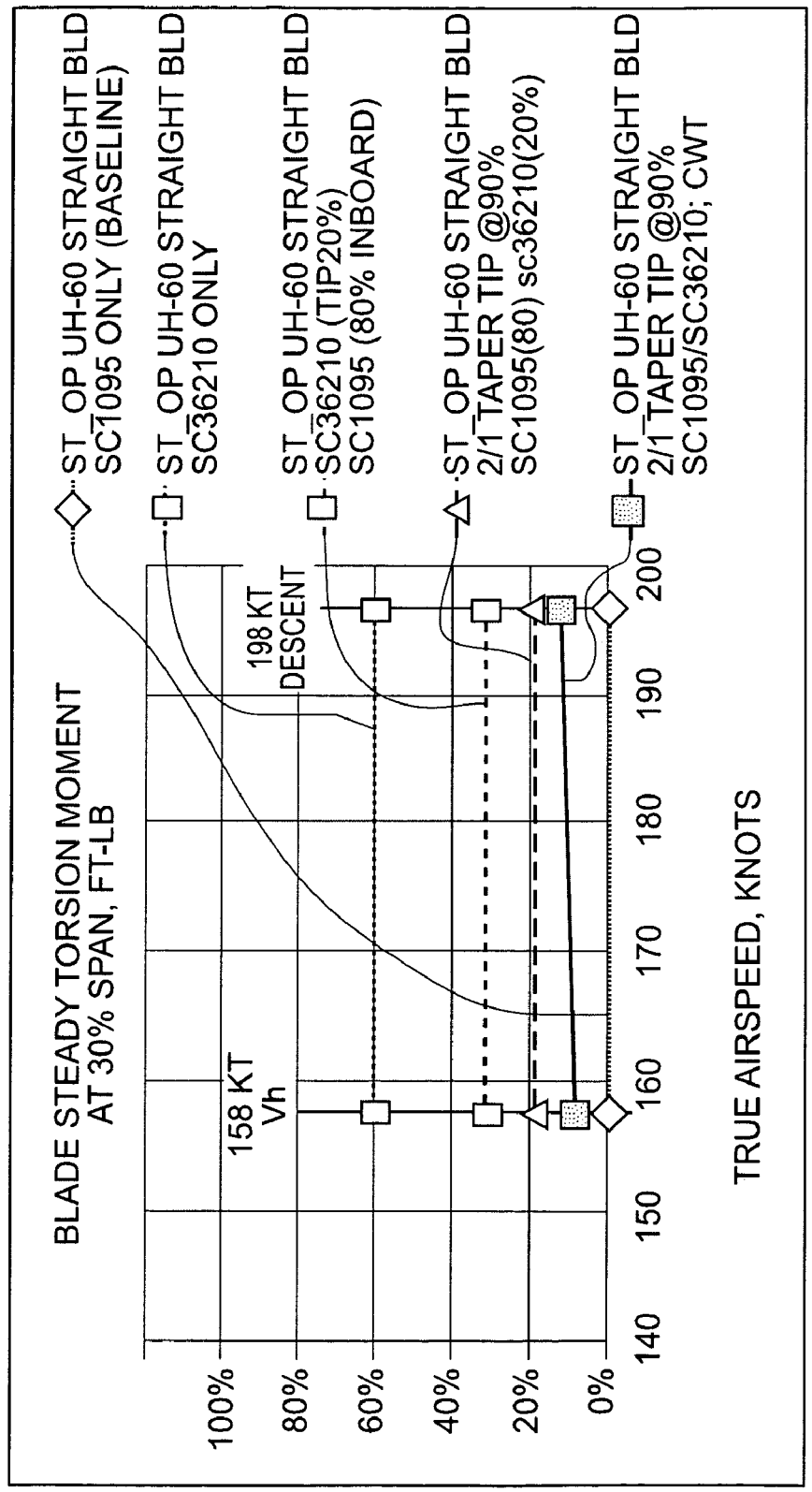
FIG. 3C is a graphical representation of steady torsion moments for a rotor blade with a straight tip, various high pitching moment coefficient airfoil extents and various tip tapers according to the one non-limiting embodiment of the present invention compared to a conventional rotor blade.
Figure 4A:
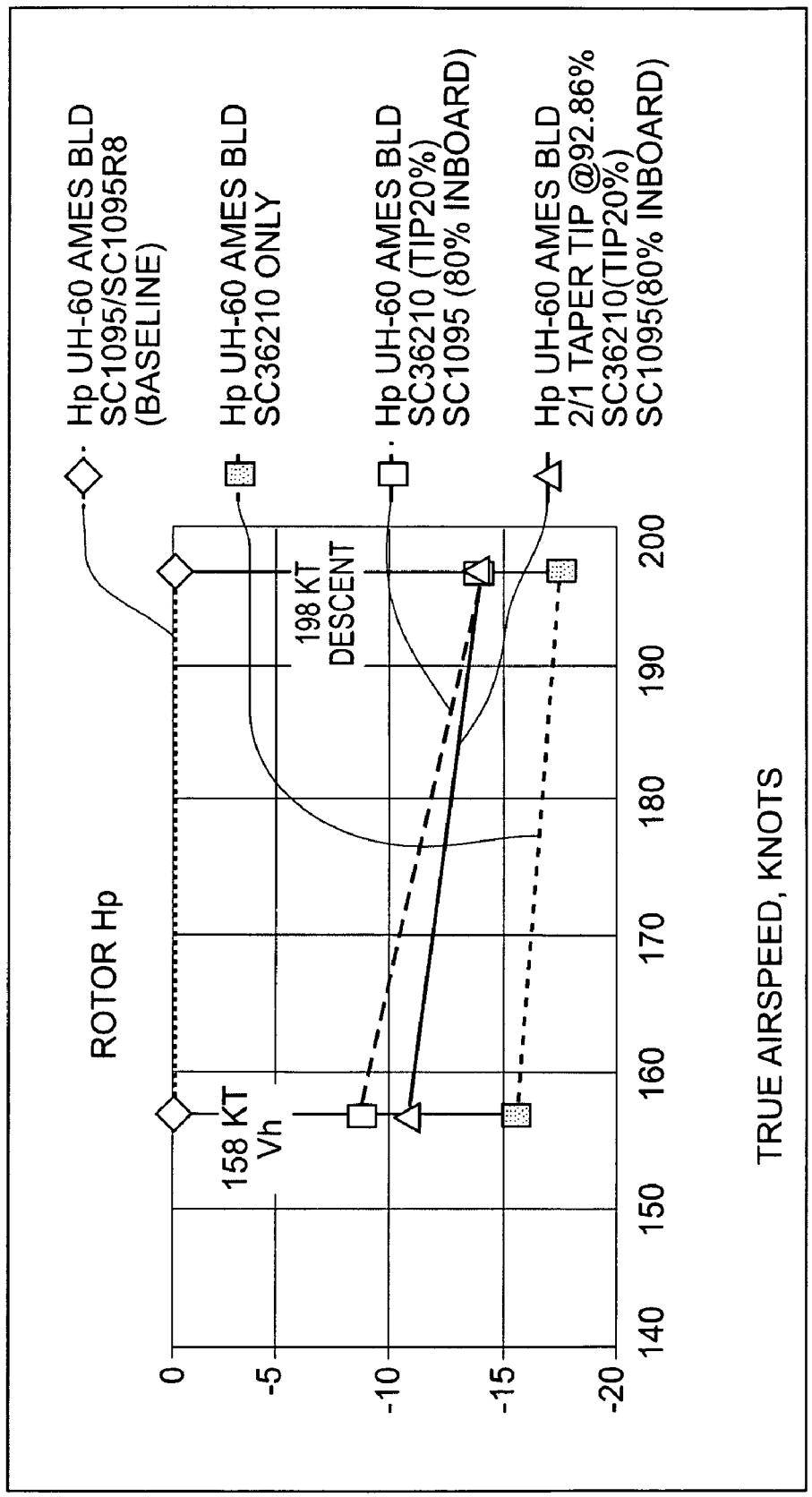
FIG. 4A is a graphical representation of rotor horsepower requirements for a rotor blade with a swept tip, various high pitching moment coefficient airfoil extents and various tip tapers according to one non-limiting embodiment of the present invention compared to a conventional rotor blade.
Figure 4B:
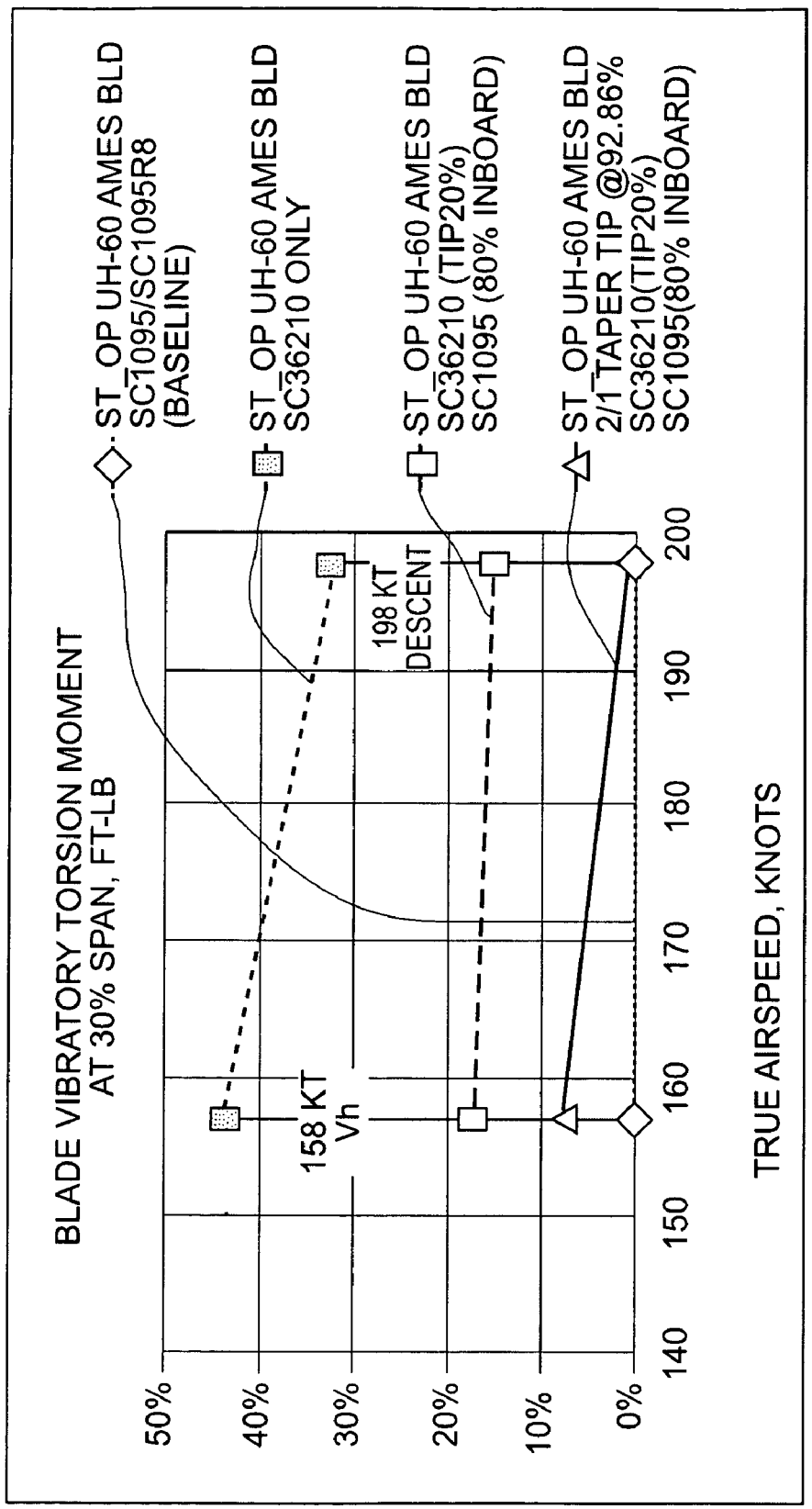
FIG. 4B is a graphical representation of vibratory torsion moments for a rotor blade with a swept tip, various high pitching moment coefficient airfoil extents and various tip tapers according to one non-limiting embodiment of the present invention compared to a conventional rotor blade.
Figure 4C:
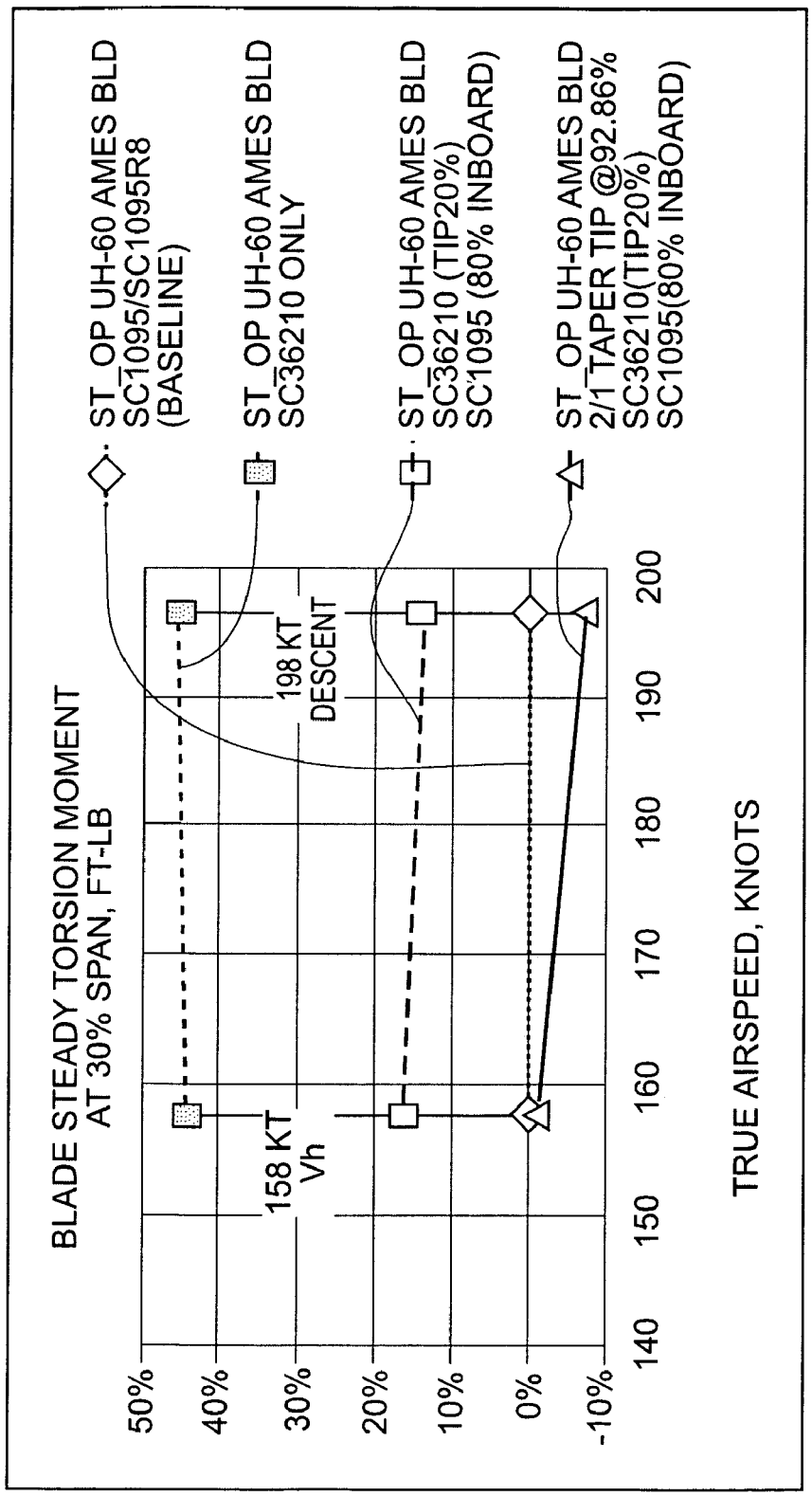
FIG. 4C is a graphical representation of steady torsion moments for a rotor blade with a swept tip, various high pitching moment coefficient airfoil extents and various tip tapers according to one non-limiting embodiment of the present invention compared to a conventional rotor blade.

FIGS. 3A-3C and 4A-4C disclose the influence of the above design parameters on the torsion moments for a blade using a high pitching moment coefficient airfoil. FIGS. 3A-3C address Steady and Vibratory torsional loading for blades with Straight tips while FIGS. 4A-4C address the same for swept tip blades.

Rotor Horsepower

Referring to FIG. 3A, the utilization of a high pitching moment airfoil section "SC-X" on either the entire blade, or just the outer 20% rotor span significantly reduces required rotor power (solid small square) in representational comparison to the baseline UH-60 standard swept tip rotor blade airfoil (SC1095). The majority of the power savings is still realized when the high pitching moment airfoil "SC-X" is only used over the outer 20% blade span (hollow small x-square). The graph further shows that adding chord taper to the tip (in this case 2/1 over the outer 10% span) saves additional power relative to the preceding case of using the high pitch moment airfoil on just the outer 20% span of a constant chord tip (triangle). Finally, a mass balance counterweight is added forward of the blade elastic axis to further control torsion (solid large square), however, minimal power impact is realized.

Vibratory Torsion Moment

Referring to FIG. 3B, rotor blade Vibratory torsion responses are provided for the main rotor blade designs delineated in FIG. 4A. Use of the high pitch moment airfoil over the entire length of straight constant chord blades results in an unacceptable 68% increase in the vibratory torsion moment (solid small square). This results from the high airfoil pitching moment coefficient alternately encountering high velocity air on the rotor disk advancing side, and low velocity air on the rotor disk retreating side. This oscillating velocity causes a large 1/rev torsion response since the dimensional airfoil torsion moment is proportional to the airfoil pitching moment coefficient multiplied by the square of the local air velocity. Reducing the extent of the high pitch moment airfoil to the outer 20% of the constant chord blade dramatically improves the situation (less vibratory torsion response) by limiting the effected blade extent (hollow small square). Application of the tip taper (triangle) and the mass balance counterweight (solid large square) give modest further improvement. Overall, limiting the high pitch moment extent to the outer 20% blade span, adding taper to the outer 20% blade span, and adding the mass balance counterweight yields an acceptable vibratory torsion solution that is close to that of the baseline straight constant chord rotor blade (hollow diamond). Note that high vibratory torsion will increase blade flatwise and edgewise vibratory bending that in turn will impact airframe vibration. Excessive airframe vibration will require a heavy mechanical vibration suppression system to avoid unnecessary passenger and/or crew discomfort.

Steady Torsion Moment

Referring to FIG. 3C, steady torsional loading generally tracks the vibratory loads of FIG. 4B. Again, using the high moment airfoil over the entire blade is unacceptable (solid small square). The high negative airfoil Cm drives torsional bending nose down in all rotor disk quadrants thereby moving the average steady loading (bending) in the same direction. High steady torsion blade bending reduces the amount of stall induced vibratory loading that can be accommodated during high lift blade stall. In turn, either the aircraft maneuverability suffers or required blade stiffening to accommodate the increased loads at stall will increase blade weight. Both have negative impacts on aircraft performance (maneuverability or reduced payload due to increased empty weight). Again, application of limiting high pitch airfoil extent (hollow small square), Tip Taper (triangle), and counterweight (solid large square) substantially and successfully mitigates most of the adverse behavior. As with the vibratory blade moment, the remaining residual steady torsion moment is considered relatively benign.

Referring to FIGS. 4A-4C, graphs for swept tip rotor blades are disclosed. Other than the graphs, a separate detailed discussion for the swept tip rotor blade is not specifically provided herein as the Swept Tip results are essentially identical to the Straight tip results. The graphs differ only in that the Swept Tip results do not show a "mass balance counterweight" impact line (as shown on the straight tip figures) since mass balance counterweights are integral and always present on swept tips. In general, swept tips have lower vibratory torsion loads than straight tips. The two sets of Figures (straight and swept) essentially show that tip taper minimizes vibration for both blade designs.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

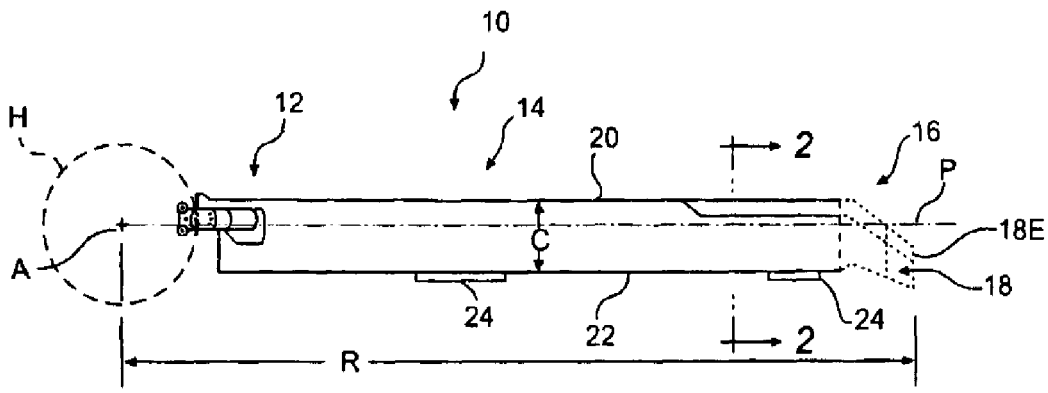

What is claimed is:

1. A main rotor blade assembly comprising:
an inboard section, an intermediate section outboard of said inboard section, and an outboard section outboard of said intermediate section, said outboard section includes an airfoil section having over an entire length a pitching moment coefficient more negative than −0.035 at Mach numbers below 0.80 and a chord taper section having a taper ratio of at least 3:1, said airfoil section and said chord taper section each extends to a distal end of a blade tip.

2. The main rotor blade assembly as recited in claim 1, wherein said blade tip comprises a straight tip.

3. The main rotor blade assembly as recited in claim 1, wherein said blade tip comprises a sheared tip.

4. The main rotor blade assembly as recited in claim 1, wherein said blade tip comprises a swept tip.

5. The main rotor blade assembly as recited in claim 4, wherein said swept tip includes an approximately 30 degree sweep.

6. The main rotor blade assembly as recited in claim 4, wherein said swept tip extends over an outer 8% of a main rotor blade span defined from said inboard section to said distal end of said blade tip.

7. The main rotor blade assembly as recited in claim 5, wherein said swept tip includes a mass balance counterweight forward of an airfoil section elastic axis.

8. The main rotor blade assembly as recited in claim 1, wherein said chord taper is applied to an outer 8% of a main rotor blade span defined from said inboard section to said distal end of said blade tip.

9. The main rotor blade assembly as recited in claim 1, wherein said chord taper section comprises a chord taper applied to an outer 10% of a main rotor blade span defined from said inboard section to said distal end of said blade tip.

10. The main rotor blade assembly as recited in claim 1, wherein said chord taper section comprises a progressive non-linear taper.

11. The main rotor blade assembly as recited in claim 1, wherein said chord taper section comprises a linear compound taper.

12. The main rotor blade assembly as recited in claim 1, wherein said chord taper section is defined relative to an inboard tapered blade chord dimension of said chord taper section divided by a smaller outboard tapered blade chord dimension of said chord taper section, said inboard tapered blade chord dimension generally equivalent to a maximum blade chord dimension of said intermediate section.

13. The main rotor blade assembly as recited in claim 12, wherein said chord taper section is defined relative to an inboard tapered blade chord dimension of said chord taper section divided by a smaller outboard tapered blade chord dimension of said chord taper section, said outboard tapered blade chord dimension less than said maximum blade chord dimension of said intermediate section.

14. The main rotor blade assembly as recited in claim 1, wherein said outboard section comprises said distal end of said main rotor blade assembly.

15. The main rotor blade assembly as recited in claim 1, wherein said smaller blade chord dimension of said outboard section is at said distal end of said main rotor blade assembly.

16. The main rotor blade assembly of claim 1, wherein said airfoil section extends along a first outer percentage of a main rotor blade span defined from said inboard section to said distal end of said blade tip and said chord taper section extends along said first outer percentage of said main rotor blade span.

17. The main rotor blade assembly of claim 1, wherein said airfoil section extends along a first outer percentage of a main rotor blade span defined from said inboard section to said distal end of said blade tip while said chord taper section extends along a second outer percentage of said main rotor blade span, said first outer percentage of said main rotor blade span different than said second outer percentage of said main rotor blade span.

18. The main rotor blade assembly as recited in claim 1, wherein said outboard section transitions into said blade tip.

19. The main rotor blade assembly of claim 1, wherein said inboard section defines an inboard section maximum chord, said intermediate section defines an intermediate section maximum chord, and said outboard section defines an outboard section maximum chord, said outboard section maximum chord no greater than equivalent to said inboard section maximum chord and said intermediate section maximum chord.

20. A main rotor blade assembly for a rotary wing aircraft comprising:
an inboard section, an intermediate section outboard of said inboard section, and an outboard section outboard of said intermediate section, said outboard section comprises an airfoil section having over an entire length a pitching moment coefficient more negative than −0.035 at mach numbers below 0.80 and a chord taper section having a taper ratio of at least 3 to 1, said chord taper section defined relative to an inboard tapered blade chord dimension of said chord taper section divided by a smaller outboard tapered blade chord dimension of said chord taper section, said inboard tapered blade chord dimension generally equivalent to a maximum blade chord dimension of said intermediate section, said airfoil section and said chord taper section each extends to a distal end of a blade tip.

21. The main rotor blade assembly of claim 20, wherein said airfoil section extends along an outer 25% of said main rotor blade span while said chord taper section extends along an outer 20% of a main rotor blade span defined from said inboard section to said distal end of said blade tip.

22. The main rotor blade assembly of claim 20, wherein said airfoil section extends along an outer 15% of said main rotor blade span while said chord taper section extends along an outer 10% of a main rotor blade span defined from said inboard section to said distal end of said blade tip.

23. The main rotor blade assembly of claim 20, wherein said airfoil section extends along an outer 10% of said main rotor blade span while said chord taper section extends along an outer 8% of a main rotor blade span defined from said inboard section to said distal end of said blade tip.

24. The main rotor blade assembly as recited in claim 20, wherein said chord taper section comprises a progressive non-linear taper 25. The main rotor blade assembly as recited in claim 20, wherein said chord taper section comprises a linear compound taper.

26. The main rotor blade assembly as recited in claim 20, wherein said outboard section comprises said distal end of said main rotor blade assembly.

27. The main rotor blade assembly of claim 20, wherein said smaller blade chord dimension of said outboard section is at said distal end of said main rotor blade assembly.

28. The main rotor blade assembly of claim 20, wherein said airfoil section extends along a first outer percentage of a main rotor blade span defined from said inboard section to said distal end of said blade tip and said chord taper section extends along said first outer percentage of said main rotor blade span.

29. The main rotor blade assembly of claim 20, wherein said airfoil section extends along a first outer percentage of a main rotor blade span defined from said inboard section to said distal end of said blade tip while said chord taper section extends along a second outer percentage of said main rotor blade span, said first outer percentage of said main rotor blade span different than said second outer percentage of said main rotor blade span.

30. The main rotor blade assembly of claim 20, wherein said inboard section defines an inboard section maximum chord, said intermediate section defines an intermediate section maximum chord, and said outboard section defines an outboard section maximum chord, said outboard section maximum chord no greater than equivalent to said inboard section maximum chord and said intermediate section maximum chord.

31. A method of fabricating a rotary-wing aircraft main rotor blade comprising the steps of:
providing the main rotor blade with an inboard section, an intermediate section outboard of said inboard section, and an outboard section outboard of said intermediate section said outboard section comprising an outer airfoil section having over an entire length a pitching moment coefficient more negative than −0.035 at Mach numbers below 0.80 over a prescribed length, said airfoil section extends to a distal end of a blade tip; and
tapering a blade chord of the main rotor blade over at least a portion of the prescribed length to define a chord taper section with a taper ratio of at least 3:1 of the outboard section, the chord taper section defined relative to an inboard tapered blade chord dimension of the chord taper section divided by a smaller outboard tapered blade chord dimension of the chord taper section, the inboard tapered blade chord dimension generally equivalent to a maximum blade chord dimension of the intermediate section and said outboard tapered blade chord dimension located at the distal end of the blade tip.

32. A method as recited in claim 31, wherein the prescribed length for the pitching moment coefficient is approximately the outer 25% of a main rotor blade span defined from said inboard section to said distal end of said blade tip and the blade taper occurs over approximately the outer 20% of said main rotor blade span, the prescribed length and the chord taper section each extends to the distal end of a blade tip.

33. The method as recited in claim 31, wherein the prescribed length for the pitching moment coefficient is approximately the outer 15% of a main rotor blade span defined from said inboard section to said distal end of said blade tip and the blade taper occurs over approximately the outer 10% of said main rotor blade span, the prescribed length and the chord taper section each extends to the distal end of a blade tip.

34. A method as recited in claim 31, further comprising locating a mass balance counterweight within the main rotor blade forward of an airfoil section elastic axis to counterbalance the tapered airfoil section.

35. A method as recited in claim 31, wherein the inboard section defines an inboard section maximum chord, the intermediate section defines an intermediate section maximum chord and the outboard section defines an outboard section maximum chord, the outboard section maximum chord no greater than equivalent to the inboard section maximum chord and the intermediate section maximum chord.

36. A main rotor blade assembly comprising: an inboard section, an intermediate section outboard of said inboard section, and an outboard section outboard of said intermediate section, said outboard section comprising an airfoil section having over an entire length a pitching moment coefficient more negative than −0.035 at Mach numbers below 0.80 and a chord taper section at least partially overlapping said airfoil section and having a taper ratio of at least 3:1.

37. The main rotor blade assembly of claim 36, wherein said inboard section defines an inboard section maximum chord, said intermediate section defines an intermediate section maximum chord, and said outboard section defines an outboard section maximum chord, said outboard section maximum chord no greater than equivalent to said inboard section maximum chord and said intermediate section maximum chord.

* * * * *

UNITED STATES PATENT AND TRADEMARK OFFICE
CERTIFICATE OF CORRECTION

PATENT NO.         : 7,547,193 B2
APPLICATION NO.    : 11/187663
DATED              : June 16, 2009
INVENTOR(S)        : Moffitt et al.

It is certified that error appears in the above-identified patent and that said Letters Patent is hereby corrected as shown below:

Please include the attached Formal Drawing Page 8/8, which was not printed in the Letters Patent.

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,547,193 B2  
APPLICATION NO. : 11/187663  
DATED : June 16, 2009  
INVENTOR(S) : Moffitt et al.

It is certified that error appears in the above-identified patent and that said Letters Patent is hereby corrected as shown below:

Delete the title page and substitute therefore the attached title page.

Delete the Drawing Sheets 1-7 and substitute therefore the attached Drawing Sheets 1-8.

This certificate supersedes the Certificate of Correction issued October 6, 2009.

Signed and Sealed this

Third Day of November, 2009

David J. Kappos
*Director of the United States Patent and Trademark Office*

United States Patent
Moffitt et al.

(10) Patent No.: US 7,547,193 B2
(45) Date of Patent: Jun. 16, 2009

(54) ROTOR BLADE ASSEMBLY WITH HIGH PITCHING MOMENT AIRFOIL SECTION FOR A ROTARY WING AIRCRAFT

(75) Inventors: Robert Moffitt, Seymour, CT (US); James E. Duh, Derby, CT (US); Charles Berezin, Trumbull, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 411 days.

(21) Appl. No.: 11/187,663

(22) Filed: Jul. 22, 2005

(65) Prior Publication Data
US 2007/0020104 A1 Jan. 25, 2007

(51) Int. Cl.
*B64C 27/46* (2006.01)

(52) U.S. Cl. .............. 416/228; 416/223 R; 416/237; 416/DIG. 5

(58) Field of Classification Search ........... 416/223 R, 416/228, 23, 24, 237
See application file for complete search history.

(56) References Cited

U.S. PATENT DOCUMENTS

| | | | | |
|---|---|---|---|---|
| 3,822,105 A | * | 7/1974 | Jepson | 416/223 R |
| 4,427,344 A | * | 1/1984 | Perry | 416/223 R |
| 5,205,715 A | * | 4/1993 | Perry et al. | 416/228 |
| 5,246,344 A | * | 9/1993 | Perry | 416/228 |
| 5,419,513 A | * | 5/1995 | Flemming et al | 244/12.2 |

* cited by examiner

*Primary Examiner*—Igor Kershteyn
(74) *Attorney, Agent, or Firm*—Carlson, Gaskey & Olds PC

(57) ABSTRACT

A main rotor blade assembly with a high negative pitching moment airfoil section having a pitching moment coefficient beyond (more negative than) −0.035 at Mach Numbers below 0.80 and a blade taper of 1:5 or greater. The main rotor blade preferably limits blade torsional bending and an aft loaded tip airfoils to approximately 'no more' than that of conventional effective rotor blade designs based on conventional tip airfoil sections.

37 Claims, 8 Drawing Sheets